(12) United States Patent
Olson et al.

(10) Patent No.: US 8,181,211 B2
(45) Date of Patent: *May 15, 2012

(54) TOTAL BANDWIDTH CONDITIONING DEVICE

(75) Inventors: Thomas A. Olson, Maryville, TN (US); David Kelma, Madisonville, TN (US); Joseph Lai, Rancho Palos Verdes, CA (US); Noah Montena, Syracuse, NY (US); Steven K. Shafer, Chittenango, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 355 days.

This patent is subject to a terminal disclaimer.

(21) Appl. No.: 12/629,278

(22) Filed: Dec. 2, 2009

(65) Prior Publication Data

US 2010/0251314 A1    Sep. 30, 2010

Related U.S. Application Data

(60) Provisional application No. 61/186,884, filed on Jun. 14, 2009, provisional application No. 61/164,820, filed on Mar. 30, 2009.

(51) Int. Cl.
*H04N 7/173* (2011.01)

(52) U.S. Cl. .................. 725/107; 725/126; 725/111

(58) Field of Classification Search .................. None
See application file for complete search history.

(56) References Cited

U.S. PATENT DOCUMENTS

| | | |
|---|---|---|
| 3,790,909 A | 2/1974 | Le Fevre |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,961,218 A | 10/1990 | Kiko |
| 4,963,966 A | 10/1990 | Harney et al. |
| 4,982,440 A | 1/1991 | Dufresne et al. |
| 5,010,399 A | 4/1991 | Goodman et al. |
| 5,020,134 A | 5/1991 | Pecaut |
| 5,126,840 A | 6/1992 | Dufresne et al. |
| 5,194,947 A | 3/1993 | Lowcock et al. |
| 5,214,505 A | 5/1993 | Rabowsky et al. |
| 5,231,660 A | 7/1993 | West, Jr. |
| 5,369,642 A | 11/1994 | Shioka et al. |
| 5,548,255 A | 8/1996 | Spielman |
| 5,745,836 A | 4/1998 | Williams |

(Continued)

FOREIGN PATENT DOCUMENTS

JP     55080989 A     6/1980

(Continued)

OTHER PUBLICATIONS

PCT/US2010/024064. International Search Report and Written Opinion. Date of Mailing: Jul. 29, 2010. 8 pp.

(Continued)

*Primary Examiner* — Brian Pendleton
*Assistant Examiner* — Jean D Saint Cyr
(74) *Attorney, Agent, or Firm* — Schmeiser Olsen & Watts

(57) ABSTRACT

An apparatus can include a modem and a conditioning device can be provided and coupled at a signal transmission line of a CATV system at a premise of a user according to embodiments of the application. The apparatus can provide selected information (e.g., Table 1) upstream for use that can improve operations or increase capabilities at one or more users.

17 Claims, 8 Drawing Sheets

U.S. PATENT DOCUMENTS

| | | | |
|---|---|---|---|
| 5,815,794 A | 9/1998 | Williams | |
| 5,839,052 A | 11/1998 | Dean et al. | |
| 5,893,024 A | 4/1999 | Sanders et al. | |
| 5,937,330 A | 8/1999 | Vince et al. | |
| 5,950,111 A | 9/1999 | Georger et al. | |
| 5,970,053 A | 10/1999 | Schick et al. | |
| 6,014,547 A | 1/2000 | Caporizzo et al. | |
| 6,049,693 A | 4/2000 | Baran et al. | |
| 6,069,960 A | 5/2000 | Mizukami et al. | |
| 6,094,211 A | 7/2000 | Baran et al. | |
| 6,188,509 B1 | 2/2001 | Lee et al. | |
| 6,205,138 B1 | 3/2001 | Nihal et al. | |
| 6,292,944 B1 | 9/2001 | Harris | |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,453,472 B1* | 9/2002 | Leano et al. | 725/111 |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,560,778 B1 | 5/2003 | Hasegawa | |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,725,463 B1* | 4/2004 | Birleson | 725/151 |
| 6,728,968 B1 | 4/2004 | Abe et al. | |
| 6,757,910 B1 | 6/2004 | Bianu | |
| 6,779,197 B1 | 8/2004 | Daughtry et al. | |
| 6,804,828 B1 | 10/2004 | Shibata | |
| 6,845,232 B2 | 1/2005 | Darabi | |
| 6,877,166 B1 | 4/2005 | Roeck et al. | |
| 6,928,175 B1 | 8/2005 | Bader et al. | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,043,750 B2 | 5/2006 | Ina | |
| 7,162,731 B2 | 1/2007 | Reidhead et al. | |
| 7,283,479 B2 | 10/2007 | Ljungdahl et al. | |
| 7,409,722 B2 | 8/2008 | Smith | |
| 7,454,252 B2 | 11/2008 | El-Sayed | |
| 7,505,819 B2 | 3/2009 | El-Sayed | |
| 7,530,091 B2 | 5/2009 | Vaughan | |
| 2001/0016950 A1 | 8/2001 | Matsuura | |
| 2002/0083466 A1 | 6/2002 | Ina | |
| 2002/0141347 A1 | 10/2002 | Harp et al. | |
| 2002/0141494 A1* | 10/2002 | Chappell | 375/228 |
| 2002/0144292 A1 | 10/2002 | Uemura et al. | |
| 2002/0166124 A1 | 11/2002 | Gurantz et al. | |
| 2002/0174435 A1* | 11/2002 | Weinstein et al. | 725/80 |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0183130 A1 | 8/2005 | Sadja et al. | |
| 2005/0204391 A1* | 9/2005 | Hunleth et al. | 725/78 |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0026659 A1 | 2/2006 | McMullin et al. | |
| 2006/0205442 A1 | 9/2006 | Phillips et al. | |
| 2006/0282871 A1 | 12/2006 | Yo | |
| 2007/0096778 A1 | 5/2007 | Shapson | |
| 2007/0288981 A1 | 12/2007 | Mitsuse et al. | |
| 2007/0288982 A1 | 12/2007 | Donahue | |
| 2008/0022344 A1 | 1/2008 | Riggsby | |
| 2008/0040764 A1 | 2/2008 | Weinstein et al. | |
| 2008/0127287 A1 | 5/2008 | Alkan et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |

FOREIGN PATENT DOCUMENTS

| | | | |
|---|---|---|---|
| JP | 55132126 A | 10/1980 |
| JP | 57091055 A | 6/1982 |
| JP | 58101582 U | 6/1983 |
| JP | 05899913 | 7/1983 |
| JP | 61157035 A | 7/1986 |
| JP | 05191416 A | 7/1993 |
| JP | 07038580 A | 2/1995 |
| JP | 11069334 A | 3/1999 |
| JP | 2001177580 A | 6/2001 |
| JP | 2004080483 A | 3/2004 |
| JP | 2005005875 A | 1/2005 |
| JP | 2007166109 A | 6/2007 |
| JP | 2007166110 A | 6/2007 |
| KR | 20050104572 A | 11/2005 |
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |
| WO | 02102047 A2 | 12/2002 |
| WO | 2005008960 A1 | 1/2005 |

OTHER PUBLICATIONS

PCT/US2010/024064. International Preliminary Report on Patentability. Date of Mailing: Oct. 13, 2011. 5 pp.

* cited by examiner

TOTAL BANDWIDTH CONDITIONING DEVICE

CROSS REFERENCE TO RELATED APPLICATIONS

This application claims priority under 35 U.S.C. §119 of U.S. Provisional Patent Application No. 61/186,884, filed Jun. 14, 2009 entitled "Total Bandwidth Conditioning Device" and U.S. Provisional Patent Application No. 61/164,820, filed Mar. 30, 2009 entitled "Upstream Bandwidth Conditioning Device Between CATV Distribution System and CATV User." The priority of the above applications is claimed and the disclosure of the above applications is incorporated herein by reference in their entirety.

FIELD OF THE INVENTION

The present invention relates generally to signal conditioning devices for use in a community antenna television ("CATV") system, and in particular to signal conditioning devices that are placed in or proximate to a premise of a user of services provided via the CATV system.

BACKGROUND OF THE INVENTION

The use of a CATV system to provide Internet, Voice-Over-Internet Protocol ("VoIP") telephone, television, and music services is well known in the art. In providing these services, a downstream bandwidth (i.e., radio frequency ("RF") signals, digital signals and/or optical signals) is passed from a supplier of the services to a user and an upstream bandwidth (i.e., radio frequency ("RF") signals, digital signals, and/or optical signals) is passed from the user to the supplier. For much of the distance between the supplier and the user, the downstream and the upstream bandwidth make up a total bandwidth that is passed via a single transmission line, such as a coaxial cable. The downstream bandwidth is, for example, signals that are relatively higher frequencies from within a total bandwidth of the CATV system while the upstream bandwidth is, for example, signals that are relatively lower frequencies.

Even though it may be possible to further expand the width of frequencies used for the total bandwidth to include even higher frequencies, there is a large effort to further compact content in the current total bandwidth. For example, digital television channels use digital compression and more advanced tuners so that three or more of these digital television channels may occupy the same width of frequencies previously occupied by a single analog television channel. Further, the technologies used to modulate and demodulate the data signals carried in the total bandwidth have become more sophisticated to carry more data while using the same width of frequencies. The demands for even more television channels and greater data throughput continue without relief.

This increased demand for television channels and data throughput does not come without difficulties. First, as described in copending U.S. patent application Ser. No. 12/252,907, incorporated herein by reference, the width of the upstream bandwidth may be expanded in relation to the downstream bandwidth to allow for a greater flow of data, such as Internet uploads and outgoing VoIP, from the user. Further, as described in copending U.S. patent application Ser. No. 12/252,817, incorporated herein by reference, the overall quality of the signals in the upstream bandwidth may be increased regardless of any increase in the width of the upstream bandwidth. Even further, as described in copending U.S. patent application Ser. No. 12/252,850, incorporated herein by reference, the quality of the signals in the downstream bandwidth may be increased, especially in light of the relative narrowing in the width of the downstream bandwidth. As described by these applications, additional devices may be added in or proximate to a premise of the user to achieve and ensure the increased width and quality requirements for more television channels and greater data throughput.

It is noted that these new devices are much more sophisticated than the traditional drop amplifiers that were added as a "fix-all" in the past. With the added sophistication comes a greater risk of failure and disruption of signals that may ultimately result in poor or unusable CATV services, user complaints, and increased service calls. Accordingly, by placing increased demands on the CATV system and by placing increasingly sophisticated devices in or proximate to the user's premise, the CATV service provider may ultimately lose users and lower/eliminate profits.

SUMMARY OF THE INVENTION

The present invention helps to create and maintain high quality signals present in both the downstream bandwidth and the upstream bandwidth. The present invention adds the ability for the CATV supplier or other personnel to monitor, identify, and control the usage of sophisticated signal conditioning devices and other CATV devices placed in or proximate to the premise of the user. Further, the present invention may include an Internet modem, a network interface controller, a switch/splitter/router, and/or wireless functionality at the sophisticated signal conditioning devices.

In accordance with one embodiment of the application, an apparatus is provided that includes a housing configured to be coupled at a signal transmission line of a CATV system at the premise of a user downstream of a first signal transmission line configured to be used by a plurality of users. The device further includes a modem configured to transmit downstream information to transmit upstream information, and a conditioning control circuit configured to modify a signal on said signal transmission line transmitted between the premise and the first signal transmission line.

In accordance with one embodiment of the application, at least one network interface controller (NIC) can be connected to the modem, a switch/splitter device can be connected to the modem, and a plurality of user devices can be connected to the modem, the at least one NIC, or the switch/splitter device. The conditioning circuit includes a drop line conditioning circuit that can be configured as a controller coupled to a NIC.

In accordance with one embodiment of the application, the modem provides data upstream that can include a downstream gain setting implemented by the conditioning control circuit using a scaled measurement or an actual measurement and a downstream slope adjustment setting implemented by the conditioning control circuit using a scaled measurement or an actual measurement.

In accordance with one embodiment of the application, the modem provides data upstream that can include upstream attenuation setting using a scaled measurement and an actual measurement, active frequency selection, and incremental frequency size. The upstream attenuation setting is implemented by the conditioning control circuit.

In accordance with one embodiment of the application, the modem provides premise connector information upstream that can include one of connector type, connector location, connector serial number, connector installation date, or a connector installer identifier for a plurality of connectors installed at the premise.

In accordance with one embodiment of the application, the modem provides connector termination status for a plurality of connectors installed at the premise.

In accordance with one embodiment of the application, the modem provides connector characteristic data upstream such as connector type, connector location, connector moisture, connector torque in a scaled measurement or an actual measurement, termination status, connector downstream bandwidth and signal level, or connector upstream bandwidth and signal level for at least one connector installed at the premise.

In accordance with one embodiment of the application, a system including the device also includes a plurality of the devices each located at a different premise, and a controller to receive and analyze downstream or upstream bandwidth characteristics to identify selected differences over a corresponding threshold among the characteristics provided by different ones of the devices.

In accordance with one embodiment of the application, the modem provides data upstream, that can include rate of change of downstream gain setting or tilt adjustment, where a rate of change over a prescribed threshold is indicative of an error condition.

In accordance with one embodiment of the application, the modem can supply rates of change of a first downstream bandwidth characteristic and a second downstream bandwidth characteristic, where an inverse correlation of the rates of change is responsive to an error condition at the premise.

In accordance with one embodiment of the application, information is one of a telephone call, a web page, a television program, a game application data, a video, or emergency signals or control signals for the apparatus, other user equipment or a supplier.

In accordance with one embodiment of the application, the conditioning control circuit is a frequency band selection device including at least two signal path sets between a tap side and a premise side, each signal path set comprising two discrete signal paths, a high frequency signal path allowing a downstream bandwidth to pass from the tap side to the premise side and a low frequency signal path allowing an upstream bandwidth to pass from the premise side to the tap side, the high frequency signal path and the low frequency signal path being separated by a cut-off transition frequency that is different for said each signal path set, a switch controller having at least two discrete switch positions, the switch controller choosing one of the switch positions as a result of an information signal, each of the switch positions corresponding to a respective one of the signal path sets, a tap side filter set including at least two frequency band splitting devices selectable by a tap side switch set wherein the tap side switch set comprises a tap side downstream switch and a tap side upstream switch, and a premise side filter set including at least two frequency band splitting devices selectable by a premise side switch set wherein the premise side switch set comprises a premise side downstream switch and a premise side upstream switch, wherein the tap side switch set and the premise side switch set are actuated by the switch controller.

In accordance with one embodiment of the application, the modem can provide selected data downstream on the forward path to a data collection device. The data collection device can include a memory circuit, a controller including a data collection circuit, a data collector or a second modem. The data collection device can subsequently transmit such data collectively, periodically, repeatedly, responsive to an inquiry or operator action, individually or in combinations.

In accordance with one embodiment of the application, the modem can provide digital channel type or analog channel type information upstream for a selected channel, block of channels, plurality of channels, or responsive to a request or a channel type change.

In accordance with one embodiment of the application, a method of operating a plurality of premise devices, can include remotely receiving information from a plurality of premise devices each corresponding to at least one premise, analyzing first information collected for a first set of premise device for a identifying corresponding trends among the first set of premise devices, transmitting first instructions to at least one of the first set of premise devices to adjust a first premise device control setting responsive to values of the first premise device control settings for other premise devices of the first set of premise devices, analyzing second information collected for a second set of premise devices for a identifying corresponding trends among the second set of premise devices, comparing the first information and the second information for adjusting operations of the second set of premise devices relative to the first set of premise devices, and transmitting second instructions to at least one of the second set of premise devices to adjust a second premise device control setting responsive to the comparing.

BRIEF DESCRIPTION OF THE DRAWINGS

For a further understanding of the nature and objects of the invention, references should be made to the following detailed description of a preferred mode of practicing the invention, read in connection with the accompanying drawings in which.

Individual components that are similar between the embodiments represented in FIGS. 1-8 are identified using the similar reference numbers.

DETAILED DESCRIPTION OF THE INVENTION

Figure 1:
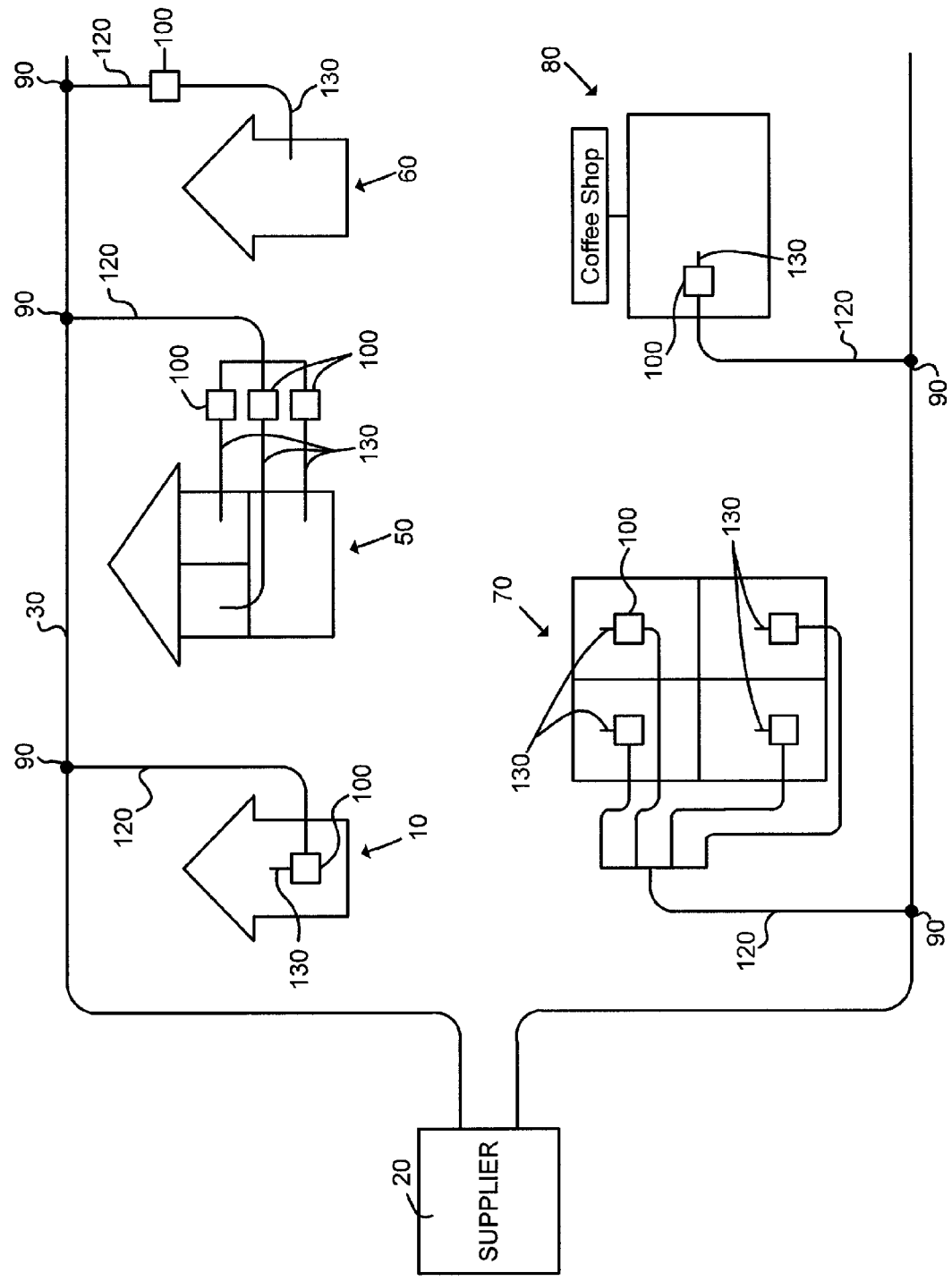
FIG. 1 is a graphical representation of a CATV system arranged in accordance with an embodiment of the present invention.

As shown in FIG. 1, a CATV system typically includes a supplier 20 that transmits a downstream bandwidth, such as RF signals, digital signals, and/or optical signals, to a user through a main distribution system 30 and receives an upstream bandwidth, such as RF signals, digital signals, and/ or optical signals, from a user through the same main signal distribution system 30. A tap 90 is located at the main signal distribution system 30 to allow for the passage of the downstream/upstream bandwidth from/to the main signal distribution system 30. A drop transmission line 120 is then used to connect the tap 90 to a house 10, 60 an apartment building 50, 70, a coffee shop 80, and so on. As shown in FIG. 1, a premise device 100 of the present invention may be connected in series between the drop transmission line 120 and a user's premise distribution system 130.

Referring still to FIG. 1, it should be understood that the premise device 100 can be placed at any location between the tap 90 and the user's premise distribution system 130. This location can be conveniently located within a premise (e.g., the house 10, the apartment building 50, etc.), or proximate to the premise (e.g., the house 60, the apartment building 70, etc.). It should be understood that the premise device 100 can be placed at any location, such as the coffee shop 80 or other business, where CATV services, including Internet services, VoIP services, or other unidirectional/bidirectional services are being used.

Figure 2:
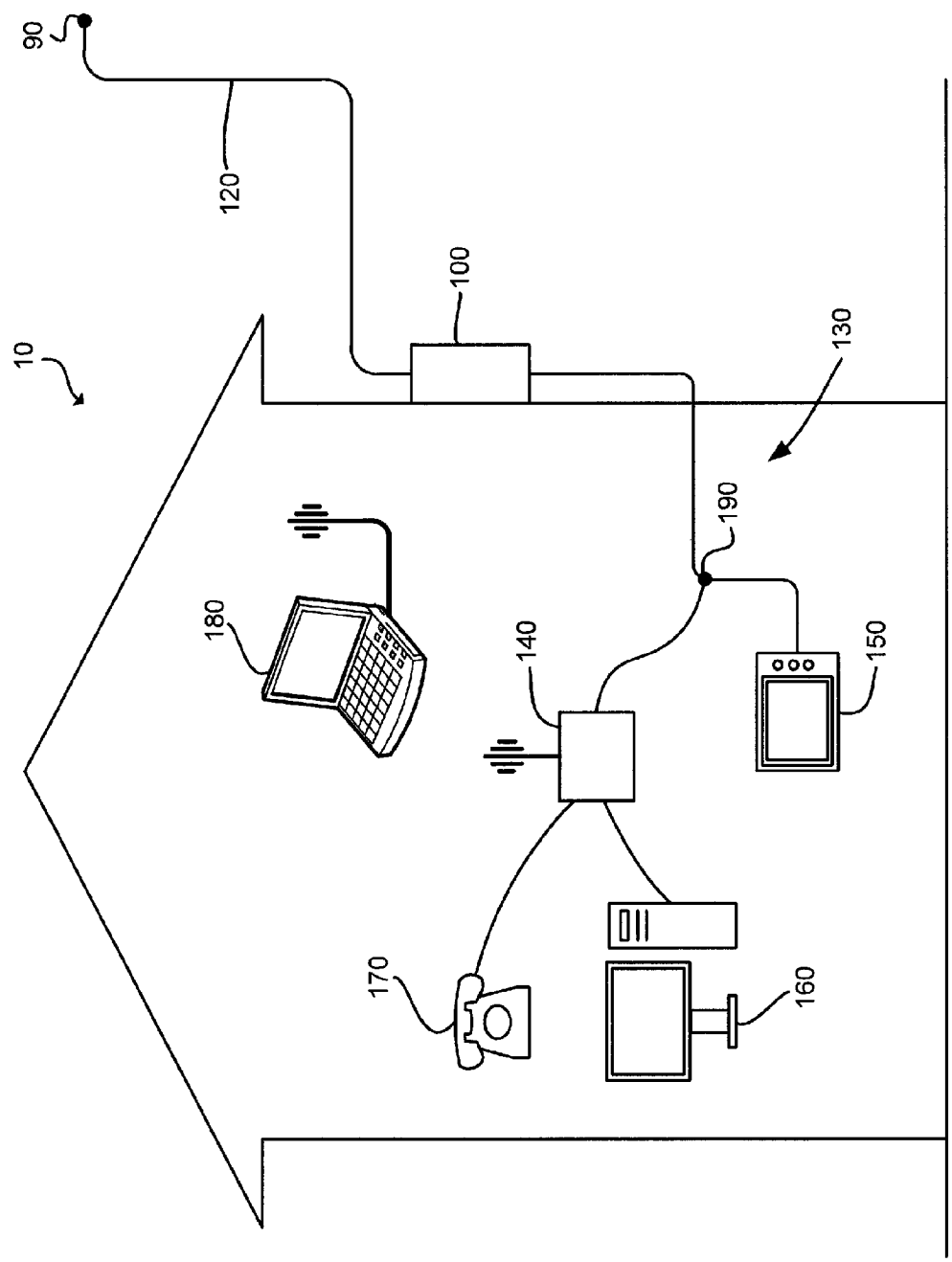
FIG. 2 is a graphical representation of a user's premise arranged in accordance with an embodiment of the present invention.

As shown in FIG. 2, the user's premise distribution system 130 may be split using a splitter 190 so that downstream/upstream bandwidth can pass to/from a television 150 and a modem 140 in accordance with practices well known in the art. The modem 140 may include VoIP capabilities affording telephone 170 services and may include a router affording Internet services to a desktop computer 160 and a laptop computer 180, for example.

Additionally, it is common practice to provide a set-top box ("STB") or a set-top unit ("STU") for use directly with the television 150. For the sake of clarity, however, there is no representation of a STB or a STU included in FIG. 2. The STB and STU are mentioned here in light of the fact that many models utilize the upstream bandwidth to transmit information relating to "pay-per-view" purchases, billing, utilization, and other user interactions, all of which may require information to be sent from the STB or STU to the supplier 20. Accordingly, it should be understood that even though FIG. 2 explicitly shows that there is only one premise device 100 used for one device (i.e., the modem 140), each premise device 100 may be used with more than one device (e.g., a modem, a STB, a STU, and/or a dedicated VoIP server) that transmit desirable upstream information signals via the upstream bandwidth.

Further, while not shown explicitly in FIG. 2, there may be one or more premise devices 100 located within or proximate to a single premise. For example, there may be a premise device 100 located between the modem 140 and the splitter 190 and another premise device 100 located between an STB or STU on the television 150 and the splitter 190. Similarly, there may be a premise device 100 located at any point in the premise distribution system 130 where an upstream bandwidth is being passed (e.g., from a modem, a STB, a STU, a VoIP server, etc.).

Further, while not shown explicitly in FIG. 2, there may by one premise device 100 located proximate to two user premises when there is one drop transmission line 120 used to connect the tap 90 to both of the two user premises. Even though such an arrangement is not considered ideal, because the upstream bandwidth from two users may be merged prior to being conditioned, such an arrangement may be necessary when the two premises are located too closely to one another for the physical placement of separate premise devices 100. There may be one premise device 100 for a plurality of user premises.

It should be understood that the goal of placing the upstream bandwidth conditioning device 2 into one of the locations described above is to increase the overall quality of the upstream bandwidth in the main signal distribution system 30 by increasing the signal-to-noise ratio of the upstream bandwidth leaving a user's premise before that particular user's upstream bandwidth is merged with those of other users.

Figure 3:
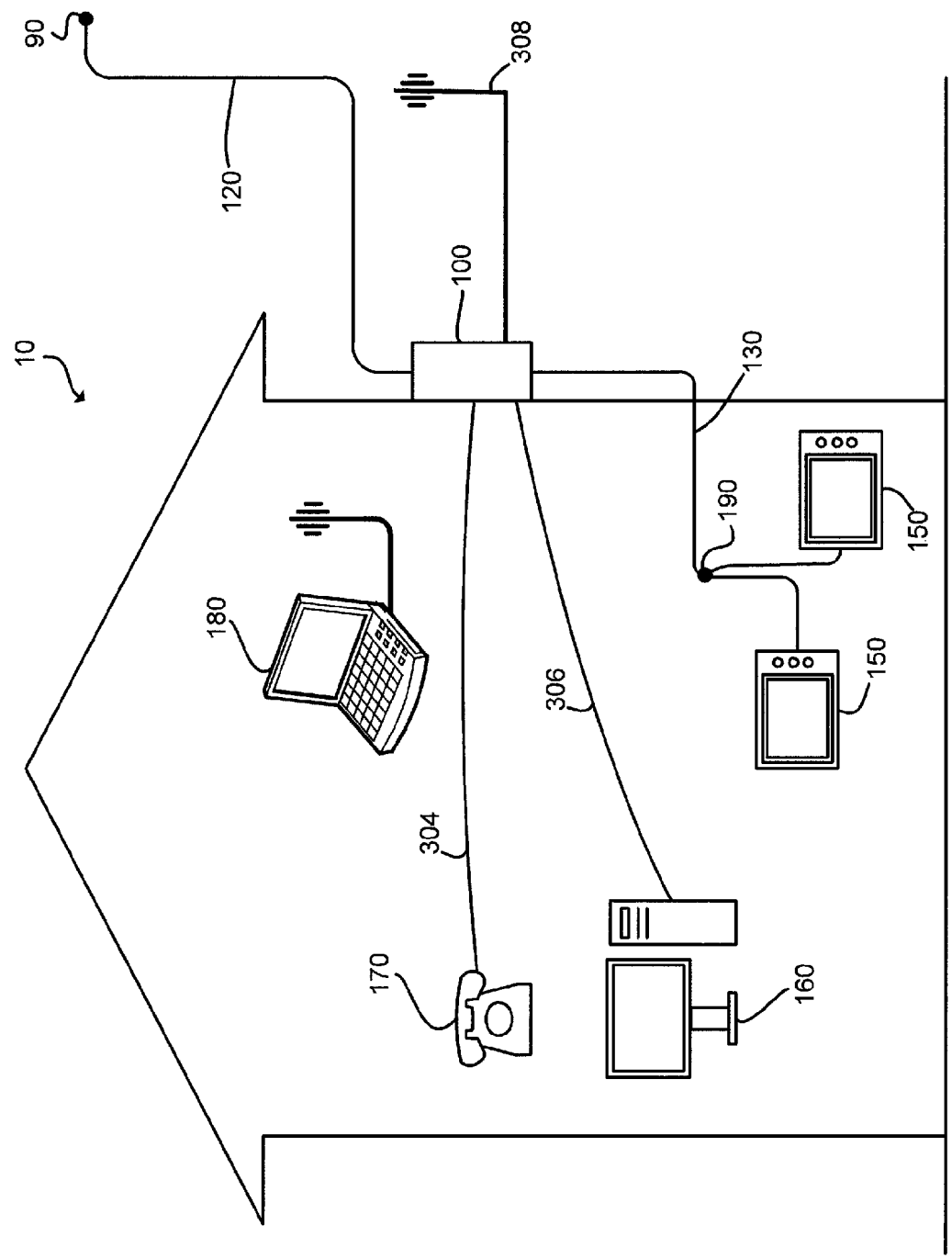
FIG. 3 is a graphical representation of a user's premise arrange in accordance with an embodiment of the present invention.

Referring now to FIG. 3, the premise device 100 may include the components, which are discussed is greater detail below, to allow for the direct connection of the computer 160, the telephone 170 and the television 150. For example, as will become more apparent based on the following discussion, the possibility of bringing a modem 302 (FIGS. 4-7) into the premise device 100 adds a significant amount of increased utility to the premise device. Additionally, if there are no traditional televisions 150, there may be no need for a premise distribution system 130 or splitter 190 in the house 10 (or other premise). Instead, the premise device 100 may be connected to the telephone 170 for VoIP services using a traditional telephone wire set 304, and the premise device 100 may be connected to the computer 160 to provide Internet services using a traditional RJ45 wire set 306. An antenna 308 may also be provided to provide the telephone 170 with VoIP services and the computer 160 with Internet services wirelessly to eliminate the telephone wire set 304 and the RJ45 wire set 306, respectively. It is also envisaged that the antenna may also be used to provide the televisions 150 with television services in the absence of the premise distribution system 130 including the splitter 190.

It should be understood that the antenna 308 may take the form of one or more antennas. For example, it is known to wirelessly provide Internet and other data networking using 2.4 GHz signals (e.g., 802.11a-g). It is also know to wirelessly provide telephone services using 1.9 GHz, 2.4 GHz and/or 5.8 GHz signals (e.g., digital enhanced cordless telecommunications ("DECT"), digital-sequence spread spectrum ("DSSS"), frequency-hopping spread spectrum ("FHSS")). The television services may be transmitted locally by the premise device 100 using entirely separate frequencies. Accordingly, a separate antenna may be provided when an optimization of a particular antenna for a service makes that antenna inefficient and/or unsuitable for another service.

Figure 8:
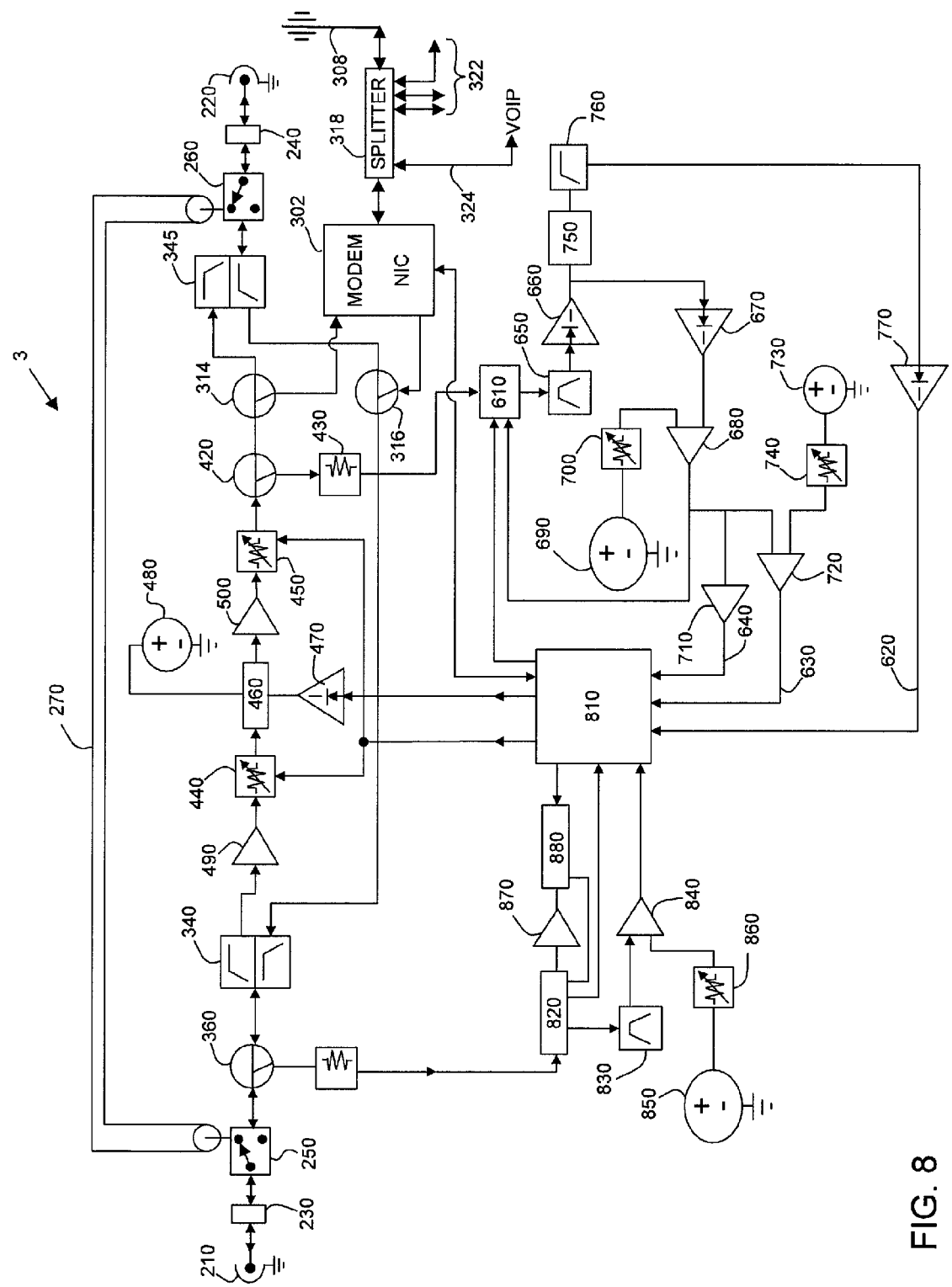
FIG. 8 is a graphical representation of a premise device made in accordance with one embodiment of the present invention that includes a downstream output level and/or output level tilt compensation device.

The premise device may 100 include, for example, a configurable frequency band selection device 1 (as described in detail in U.S. patent application Ser. No. 12/252,907) (FIG. 4), an upstream bandwidth conditioning device 2 (as described in detail in U.S. patent application Ser. No. 12/252,817) (FIGS. 5 and 6) and/or a downstream output level and/or output level tilt compensation device 3 (as described in detail in U.S. patent application Ser. No. 12/252,850) (FIG. 8). The function of each of these devices, and others, will be discussed herein to such a degree that is relevant to the present application, and to such a degree that the use of the present invention with those, and other, devices is enabled. These applications should be referenced when further information about these devices is desired.

Generically referring to all of the FIGS. 4-7, the premise device 100 includes a supplier side connector 210 and a premise-side connector 220. The supplier-side connector 210 is positioned to pass the downstream bandwidth from the supplier 20 (FIG. 1) into the premise device 100 and to pass the upstream bandwidth from the premise device 100 to the supplier 20. The premise-side connector 220 is positioned to pass the downstream bandwidth from the premise device 100 to the user and to pass the upstream bandwidth from the user into the premise device 100.

Each of the premise-side connector 220 and the supplier-side connector 210 can be a traditional threaded 75 ohm connector so that the premise device 100 can be easily placed in series with any portion of the premise distribution system 130 and/or in series between the drop transmission line 120 and the premise distribution system 130 using readily available "F" type connectors. This "in series" placement ensures that all of the all of the downstream/upstream signals pass through the premise device 100. It should be understood that the "in series" placement may not include a physical connection to the premise distribution system 130 when the television 150 is connected wirelessly using the antenna 308, as discussed above in relation to FIG. 3. Further, this "in series" placement should be understood to include situations where the premise device 100 is connected in series between the drop transmission line 120 and the RJ45 wire set 306 and/or the telephone wire set 304.

The premise-side connector 220 and the supplier-side connector 210 may be a connector other than an "F" type connector. For example, at least one of the connectors 210, 220 may be a proprietary connector (i.e., a non-industry standard connector) designed to hinder attempts at tampering with or to hinder attempts at stealing of the upstream bandwidth conditioning device 2. Other connector types may also be used depending on the type and/or size of the drop transmission line 120, the type and/or size of the premise distribution system 130, or the impedance of the system. With regard to the latter, it should be understood that connectors are purposefully varied in some instances to avoid the placement of components having one characteristic impedance in a system having another characteristic impedance. The premise-side connector 220 may be eliminated entirely or replaced with an RJ45 connector, or the like, if the traditional premise distribution system 130 is eliminated in favor of wireless connections via the antenna 308 or is eliminated in favor of wired connections other than coaxial cable, such as RJ45, HDMI, component video, optical, and other connection techniques.

Still referring generically to FIGS. 4-7, the premise device 100 may include a surge protection device 230 positioned near the supplier-side connector 210 and a surge protection device 240 positioned near the premise-side connector 220. Having two surge protection devices 230, 240 attempts to protect the premise device 100 from energy passing from the drop transmission line 120 from a lightning strike and from energy passing from the premise distribution system 130 from a lightning strike. It should be understood that the surge protection devices may not be necessary if/when the premise device 100 is configured to be placed in a CATV system that utilizes non-conductive signal transmission lines, such as optical transmission lines. Any of the high quality, commercially available lightning, or surge protection devices will function well within the specified locations within the premise device 100.

The premise device 100 preferably includes two power bypass failure switches 250, 260 that route all of the upstream\downstream signals through a bypass signal path 270 (e.g., a coaxial cable, an optical cable, a microstrip, a stripline, etc.) in the event of a power outage. The bypass failure switches 250, 260 are preferably located near the supplier-side connector 210 and premise-side connector 220, respectively. In an effort to protect the bypass failure switches 250, 260 from damage due to lightning energy, they are preferably placed between the surge protection devices 230, 240.

Each of the bypass failure switches 250, 260 includes a default position bypassing the upstream/downstream signals through the bypass signal path 270 at any time power is removed from the premise device 100. When power is applied, each of the bypass failure switches 250, 260 actuate to a second position that disconnects the bypass signal path 270 and passes all of the upstream\downstream signal transmissions along another path through the circuit 205 (FIG. 4) within the main circuit 200. The switches may also be controlled such that when there is a fault detected in the premise device 100 that could abnormally hinder the flow of the upstream\downstream bandwidths through the circuit 205 (FIG. 4), the switches 250, 260 are moved to their default position sending the upstream/downstream signal transmissions through the bypass signal path 270. Any of the high quality, commercially available single pole double throw (SPDT) analog switches will function well within the specified locations within the premise device 100. The bypass signal path 270 can be any suitable conductive cable, conductive trace, or optical cable depending on the CATV system configuration and physical space within the premise device.

Figure 4:
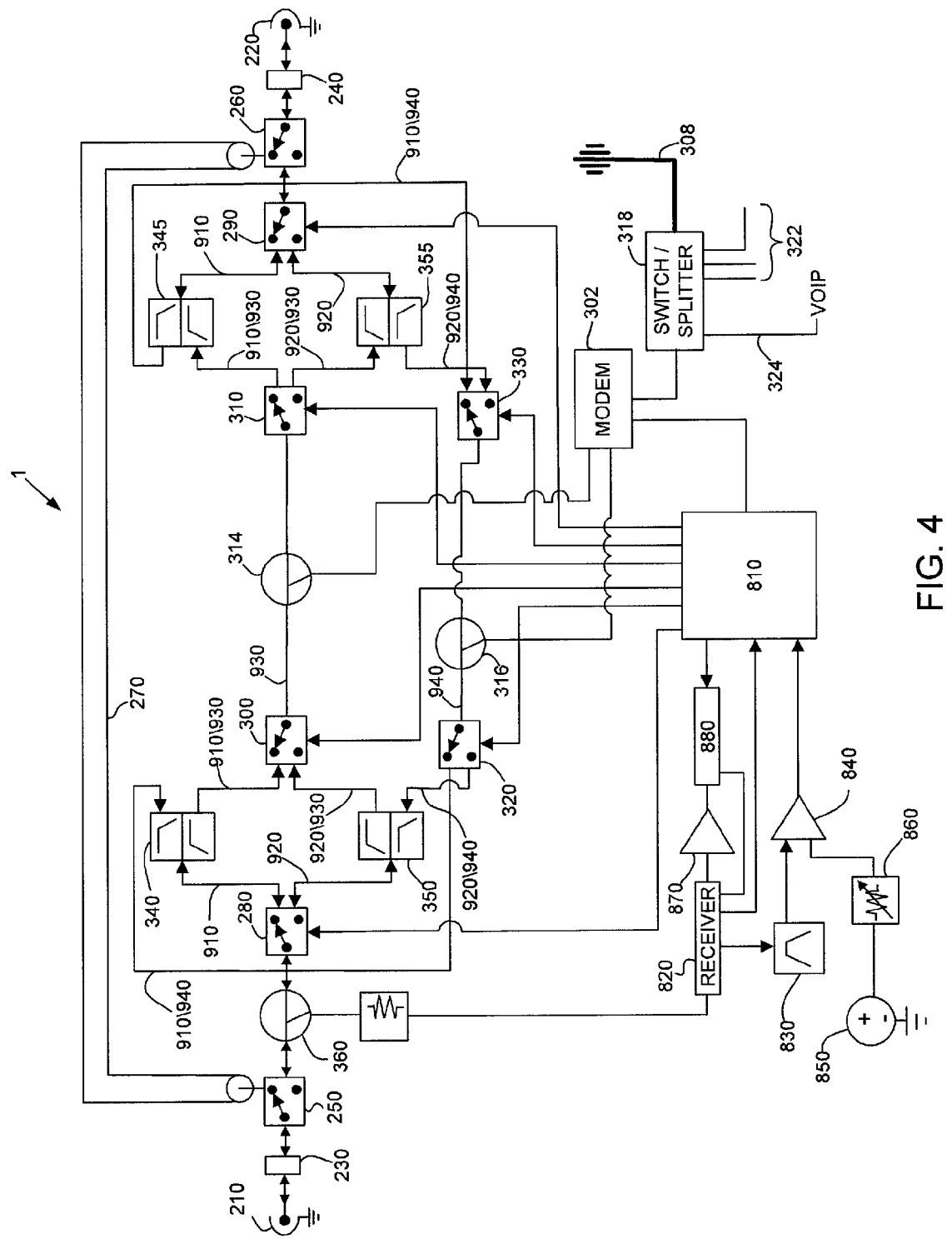
FIG. 4 is a graphical representation of a premise device made in accordance with one embodiment of the present invention that includes a frequency band selection device.

The premise device 100 may include circuit components creating the frequency band selection device 1 (FIG. 4). The frequency band selection device 1 is configured to automatically switch between a configuration corresponding to earlier Data Over Cable Service Interface Specification ("DOCSIS") specifications and a configuration corresponding to a later generation specification, such as DOCSIS 3.0. While this feature may be advantageous by itself in the premise device 100, this feature allows for other devices, such as the upstream bandwidth conditioning device 2 and the downstream bandwidth output level and/or output level tilt compensation device 3, to remain relevant after a change between specifications. In particular, because each of these devices requires an accurate separation of signals between the upstream bandwidth and the downstream bandwidth, any necessary change in the upstream/downstream bandwidths would render these specific devices inoperable. It should be understood that even though the DOCSIS specifications are referenced above and below, the upstream/downstream bandwidth configurations may be maintained and changed according to any specifications.

A simplified version of the of the frequency band selection device 1 is shown in FIG. 4. The frequency band selection device 1 includes a plurality of switches 280, 290, 300, 310, 320, 330 that define a first signal path set 910 and second signal path set 920. Each signal path set includes two discrete signal paths, a forward path 930 and a return path 940. The first signal path set 910 is formed using a first pair of diplexer filters 340, 345, and the second signal path set 920 is formed using a second pair of diplexer filters 350, 355. A cutoff frequency set by the first pair diplexer filters 340, 345 corresponds to DOCSIS specifications having a narrower upstream bandwidth, and a cutoff frequency set by the second pair of diplexer filters 350, 355 corresponds to the later DOCSIS specifications, which include a wider upstream bandwidth than the earlier DOCSIS standards. It should be understood that the cutoff frequencies can be changed to accommodate even newer DOCSIS standards or other standards by the mere replacement of the first pair diplexer filters 340, 345 and/or the second pair of diplexer filters 350, 355. Any of the high quality, commercially available SPDT analog switches and diplexer filters will function well within the specified locations within the premise device 100.

Each of the switches 280, 290, 300, 310, 320, 330 is controlled either directly or indirectly by a microprocessor 810. The microprocessor 810 determines whether to actuate the switches 280, 290, 300, 310, 320, 330 to the first signal path set 910 or to the second signal path set 920 based on an information transmission signal sent via downstream bandwidth by the supplier 20. A signal coupler 360 allows for a receiver to 820 to receive the information transmission signal, such as a tone, a coded operational signal, or any of the other well known information transmission signals that can be understood by the microprocessor 810 to indicate the switch position. For example, the presence of tone at a particular frequency can be used to indicate that the microprocessor 810 should select the second signal path set 920, whereas no tone at the particular frequency could indicate that microprocessor 810 should select the first signal path set 910.

The frequency of the receiver 820 can be set by the microprocessor 810 and can be tuned to a particular frequency by a phase-locked loop control system 880 in any of the manners that are well known in the art. The receiver 820 may also be fixed to a single frequency if and/or when that frequency is sufficient to carry the desired information transmission signal. It should be understood that the receiver 820 may be tuned to a frequency where the information transmission signal is expected. In the present instance, the expected frequency may be a frequency within a range of 110-135 MHz because the components of the receiver 820, are relatively inexpensive for this frequency range. It should also be understood that the particular frequencies may, as in the present case, be a frequency within a typical CATV channel, but between the video carrier frequency and audio carrier frequency.

Further there may be multiple particular frequencies with some located in the upstream bandwidth and some located in the downstream bandwidth. For example, when the information transmission signal is being passed from the supplier 20, the information transmission signal may be sent on one or more particular frequencies within the downstream bandwidth. Alternatively, when the information transmission signal is sent from a technician, a user, or a device within the premise of the user, the information transmission signal may be sent using one or more particular frequencies within the upstream bandwidth. In such cases, there may be one receiver 820 that is tunable between the particular frequencies or one receiver 820 for each particular frequency (e.g., one receiver for use with the upstream bandwidth, and one receiver for use with the downstream bandwidth).

In its simplest form, the information transmission signal can be a tone (e.g., 100 kHz) that is RF modulated onto the particular frequency. If a tone is going to be used as an information transmission signal, the receiver 820 may then include a tone demodulator, which are well known in the art, to identify whether a tone is present and provide an output to the microprocessor 810 indicating whether a tone is present. As indicated above, there may be provisions in the premise device 100 for more than one receiver 820 or a receiver 820 that can tune to a plurality of frequencies to identify tones in those frequencies for the purpose of providing a more detailed control of the premise device 100. While not necessarily needed for the frequency band selection device 1, the information transmission signal may also be a coded operational signal. The coded operational signal may be provided on the particular frequency along with the tone, or the coded operational signal may be provided by itself on the particular frequency. In the present embodiment, a coded operational signal is RF modulated along with the tone. For example, the coded operational signal is provided at 500 Hz on the particular frequency, and provides for a transfer rate of 9600 baud. To accommodate the tone and the coded operational signal in the present example, the mixer in the receiver 820 provides two outputs, one with a band pass filter to pass the 100 Hz tone to the tone demodulator, and one with a band pass filter to pass the 500 Hz signals to a demodulator, which is well known in the art, to convert the RF signals into a data steam, such as RS232, suitable for use by the microprocessor 810.

As shown in FIG. 4, the premise device 100 may also include a modem 302 for the transfer of information transmission signals to and from the premise device 100 using known methods, such as DOCSIS. As shown, the modem 302 may be connected to the forward path 930 using a signal coupler 314, and the modem 302 may be connected to the return path 940 using a signal coupler 316.

If the modem is only to be used to transfer information transmission signals relating to the operation of the premise device 100, the modem 302 may be connected to the microprocessor 810 using a network interface controller (NIC), which may provide the premise device 100 a media access control ("MAC") address and/or a TCP/IP address so that the particular premise device may be specifically addressed to send/receive any information transmission signals.

The premise device 100 may also be provided with a switch/splitter 318 that may allow connections to be made by other devices, such as a computer, to the modem 302 for the purpose of communicating to the premise device and for the purpose of communicating via the Internet. The premise device 100 can collect and report out operational data relevant to the corresponding premise. The switch/splitter 318 may include one or more antennas 308, one or more wired connections, such as RJ45, USB, Firewire, RS232, parallel, and/or a VoIP server. As mentioned above, the antenna 308 may be used to wirelessly connect the computer 160 (FIG. 3), the telephone 170 (FIG. 3), and/or the television 150 (FIG. 3). Further, as will be discussed more fully below, any of the connections 308, 322, 324 may be used by a technician to exchange data with the premise device 100.

Figure 5:
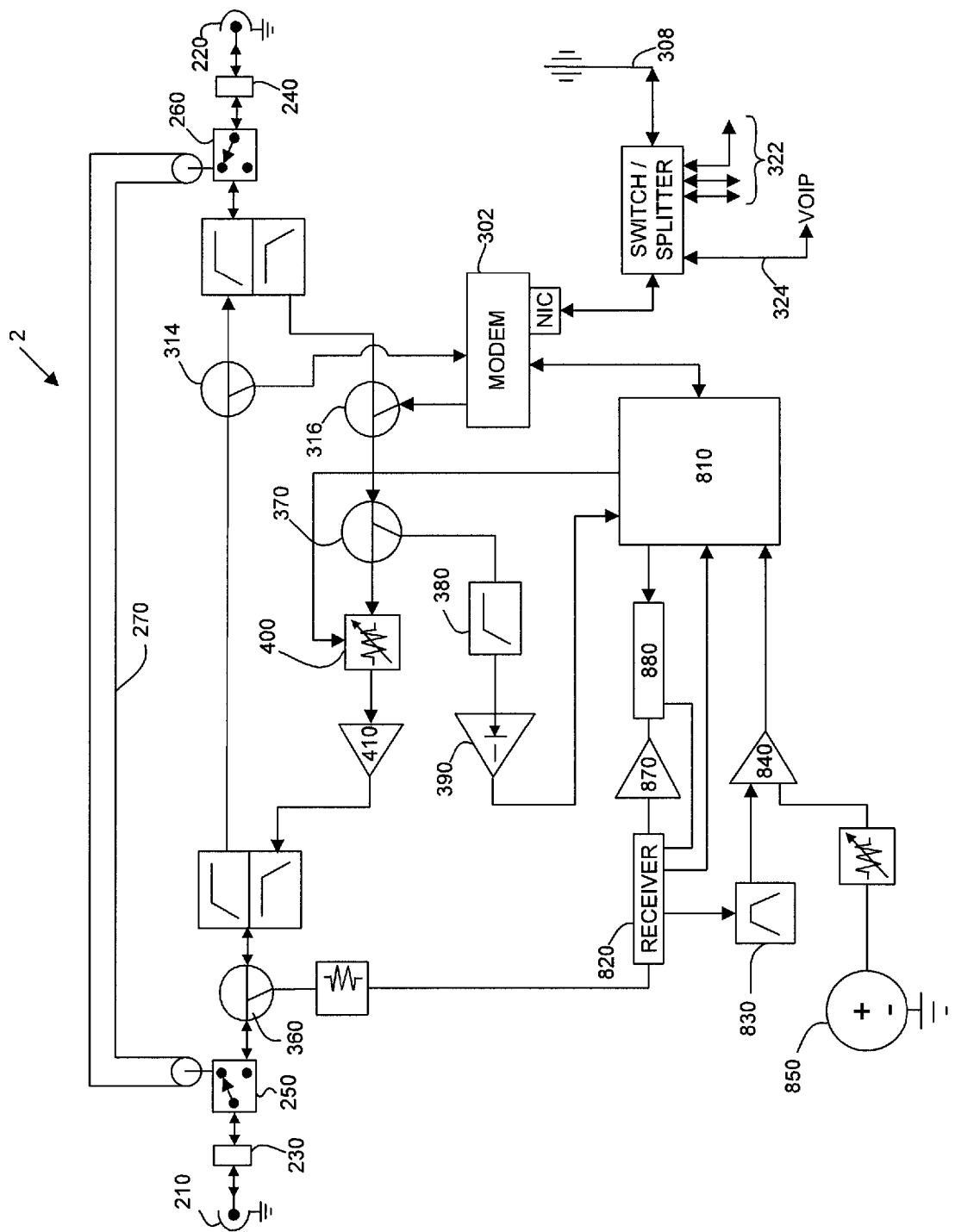
FIG. 5 is a graphical representation of a premise device made in accordance with one embodiment of the present invention that includes an upstream bandwidth conditioning device.

Referring now to FIG. 5, the premise device 100 may further include circuit components creating the upstream bandwidth conditioning device 2, which increases the signal to noise ratio of the upstream bandwidth, which is created on the user's premise and is passed into the upstream bandwidth on the main signal distribution system 30. The present device purposefully includes logic and structure that will halt the addition of attenuation once the maximum output of the cable modem is sensed even if the upstream data flow is consistent enough to be interpreted as noise.

As shown in FIG. 5, the upstream bandwidth conditioning device 2 of one embodiment of the premise device 100 includes a variable attenuator 400 and an amplifier 410. In the present embodiment the amount of signal level adjustment is set through the variable control of the variable attenuator 400 based on instructions from the microprocessor 810. Because a routine for determining and applying the amount of attenuation is similar to that used in the embodiment represented in FIG. 6, the routine will be discussed in relevant detail below in relation to FIG. 7.

Figure 6:
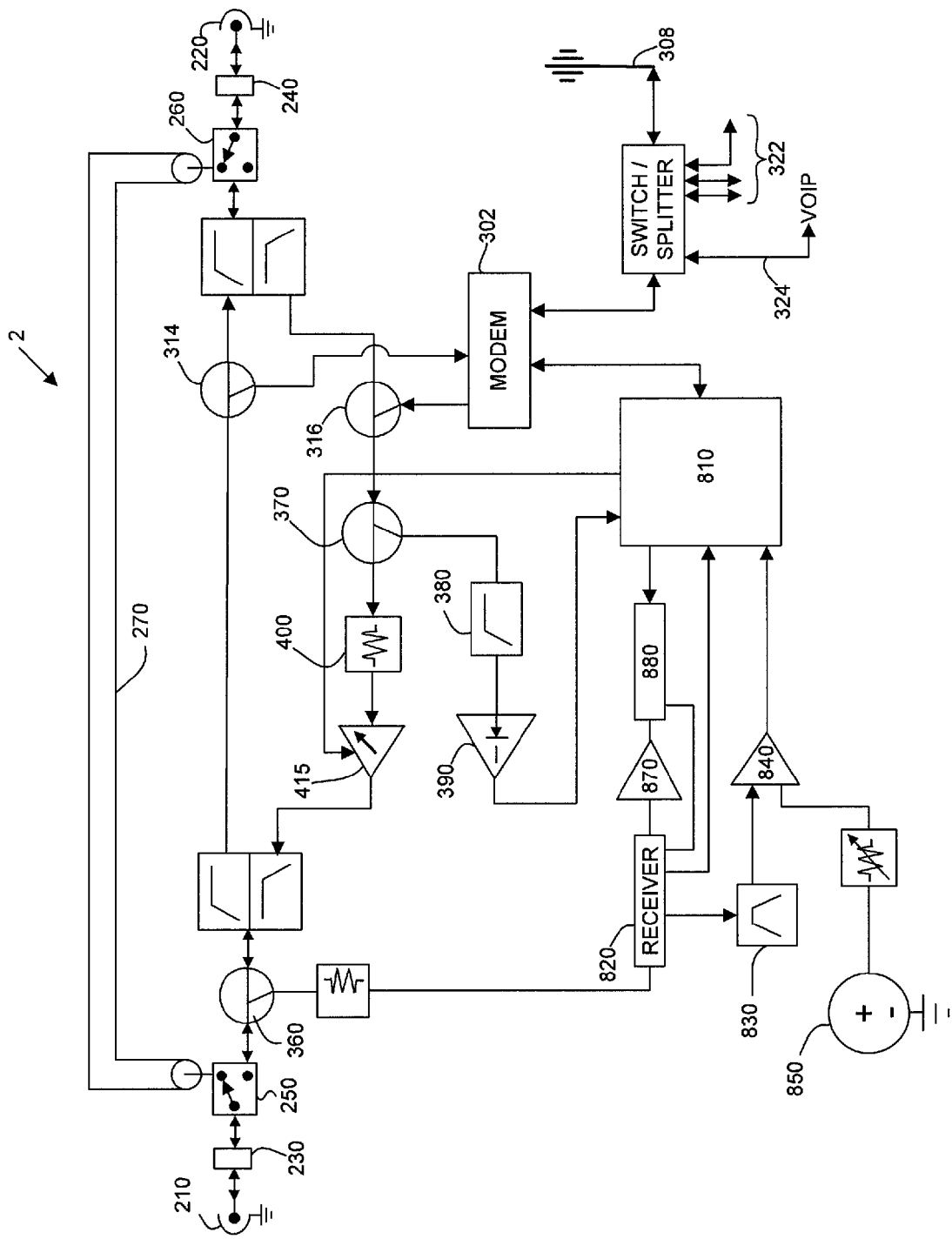
FIG. 6 is a graphical representation of a premise device made in accordance with one embodiment of the present invention that includes an upstream bandwidth conditioning device.

As shown in FIG. 6, another embodiment of the upstream bandwidth conditioning device 2 includes a variable amplifier 415, which is connected and controlled by the microprocessor 810. According to this embodiment, an attenuator 402 is present and is not controlled by the microprocessor 810. Other embodiments are envisioned that include both a variable amplifier 415 and a variable attenuator 400. Further, the variable signal level adjustment device could also be an automatic gain control circuit ("AGC") and function well in the current device. In other words, it should also be understood that the amount of signal level adjustment and any incremental amount of additional signal level adjustment can be accomplished through any of a wide variety of amplification and/or attenuation devices.

In light of the forgoing, the term "variable signal level adjustment device" used herein should be understood to include not only a variable attenuation device, but also circuits containing a variable amplifier, AGC circuits, other variable amplifier/attenuation circuits, and related optical circuits that can be used to reduce the signal strength on the upstream bandwidth.

It should be noted that the term contemporary signal strength is intended to describe a current or present signal strength as opposed to a signal strength measured at a time in the past (i.e., a previous signal strength) such as prior to an application of signal level adjustment or an application of an additional amount of signal level adjustment. The reason for this point should be clear based on the following.

As mentioned above, the microprocessor 810 within the upstream bandwidth conditioning device 2 (FIGS. 5 and 6) performs a signal level setting routine to determine an appropriate amount of signal level adjustment to apply to the upstream bandwidth via the variable attenuator 400, the variable amplifier 415 or other suitable variable signal level adjustment device. The signal level setting routine can be run continuously, at predetermined intervals, and/or on command as a result of an information signal transmitted by the supplier 20. Once initiated, the microprocessor 810 or logic circuit can operate to perform the signal level setting routine in accordance with the flow chart shown in FIG. 7.

Figure 7:
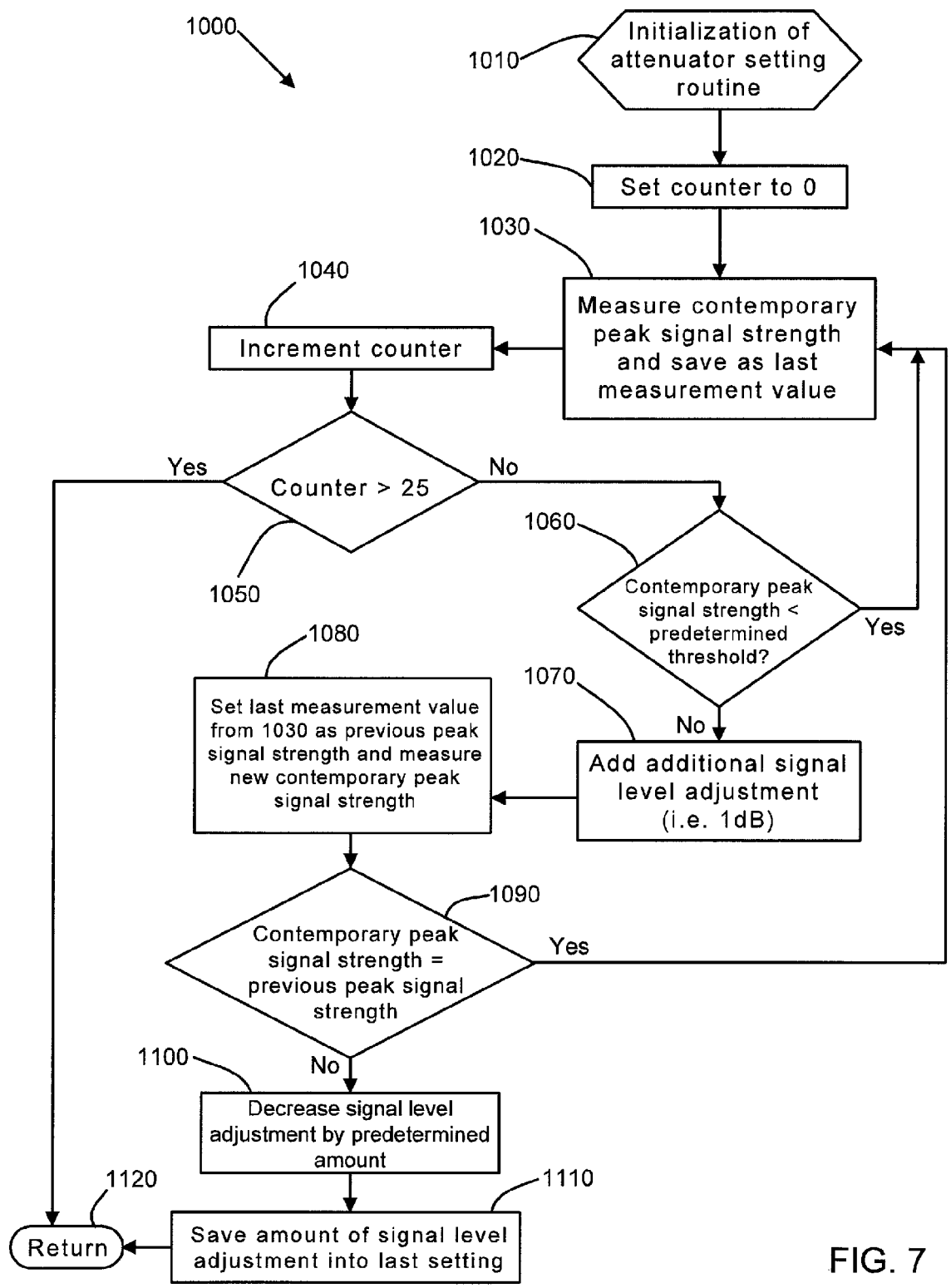
FIG. 7 is a flow chart of an attenuation setting routine.

Referring now to FIG. 7, upon initialization 1010 of the signal level setting routine 1000, the counting circuit in the microprocessor 810 is reset to zero (0), for example, in step 1020. Next, the microprocessor 810 iteratively performs steps 1030, 1040, 1050, 1060, 1070, 1080 and 1090 until the counter reaches a predetermined number (e.g., 25) or the answer to step 1080 is negative.

Specifically, in step 1030 the microprocessor 810 reads a contemporary signal strength from the signal level detector 390, and the counter is incremented by a predetermined increment, such as one (1) in step 1040. The microprocessor 810 then looks to see if the counter is greater than the predetermined number (i.e., 25). If so, the microprocessor 810 ends the routine, but if not, the microprocessor 810 proceeds to step 1060. In step 1060, the microprocessor 810 can compare the contemporary signal strength to a predetermined threshold. If the contemporary signal strength is greater than the predetermined threshold, the microprocessor 810 instructs the variable attenuator 400 to add an amount of additional signal level adjustment (e.g., 1 dB), but if the contemporary signal strength is lower than the predetermined threshold, the microprocessor 810 returns to step 1030.

After adding the amount of additional signal level adjustment, the microprocessor 810 reads a new contemporary signal strength in step 1080 while saving the previously read contemporary signal strength (i.e., from step 1030) as a previous signal strength in preparation for step 1090. In step 1090, the microprocessor 810 compares the contemporary signal strength measured in step 1080 and the previous signal strength measured in step 1030 to one another. If the contemporary signal strength is equal to the previous signal strength then the microprocessor 810 returns to step 1030, but if the contemporary signal strength is less than the previous signal strength the microprocessor 810 proceeds to step 1100 where it instructs the variable attenuator 400 to reduce the amount of signal level adjustment by a predetermined amount (e.g., the amount of additional signal level adjustment added in step 1070 or an amount greater than the additional signal level adjustment added in step 1070). In step 1110, the microprocessor 810 saves the total amount of signal level adjustments. In step 1120, the routine can be completed. Again, it should be understood that the amount of additional signal level adjustment may be added/removed by the variable amplifier 415, or by the AGC discussed above.

As mentioned above, an important aspect of the present signal level setting routine is the comparison step conducted in step 1090. In one embodiment, a traditional cable modem 140 (FIG. 2) used in CATV systems and/or the modem 302 can adjust its output level based on information signals received from the suppler in the downstream bandwidth. In particular, if the modem signal received by the supplier 20 is weak, the supplier 20 instructs the modem 140 to increase its transmission signal level. As this relates to the current invention, the modem 140 will continually increase signal level as a result of increased amounts of upstream bandwidth signal level adjustment until the modem 140 can no longer increase its transmission signal strength. Accordingly, the contemporary signal strength measured in step 1080 after the addition of additional signal level adjustment in step 1070 should be equal to the previous signal strength if the modem 140 is able to compensate for the additional signal level adjustment. However, if the modem 140 is already producing its maximum signal strength, the contemporary signal strength will be less than the previous signal strength when an additional amount of upstream bandwidth signal level adjustment is applied.

Because problems could result in the modem 140 and/or the modem 302 from operating it at its maximum output (i.e., signal distortion may be high when the modem 140 is operating at or near a maximum level and/or the durability of the modem 140 may be sacrificed when the modem 140 is operating at or near a maximum level), the amount of signal level adjustment may be reduced by a sufficient amount in step 1100 to ensure quality of the output signal generated by the modem 140 and the durability of the modem 140 once the maximum output strength of the modem 140 is identified.

It is noted that in a system with more than one device passing data packets into the upstream bandwidth, the premise device 100 may identify the maximum output strength of one device and not the other. In other words, the premise device 100 may identify the first device achieving its maximum output strength without proceeding to identify the maximum output strength of any other devices. If the premise device 100 fails to identify the first observed maximum output strength, that device may continue to operate at its maximum output strength until another determination cycle is initiated.

The predetermined number compared in 1050 can be related directly to the amount of signal level adjustment. For example, if the variable signal level adjustment device is a step attenuator including 32 steps of 1 dB attenuation, as is the case in the embodiment represented in FIG. 5, the predetermined number can be set to 25 to allow for the finest resolution (e.g., <1 dB, 1 dB) and the broadest use of the particular step attenuator's range (e.g., 32 dB). It should be understood that the number of steps could be reduced and the resolution could be decreased (i.e., 5 steps of 5 dB) if faster overall operation is desired. It is also foreseeable that the predetermined number could be increased if a variable signal level adjustment device having a finer resolution or broader range is utilized. The incremented amount discussed here relating the counter and the predetermined number is one (1) such that there are 32 iterations (i.e., 32 steps) when the predetermined number is 32. The increment could easily be any number (i.e., 1, 5, 10, −1, −10, etc.) depending on the predetermined number and the total number of steps desired, which, as discussed above, is based on the desired resolution and the desired range of signal level adjustment.

The amount of additional attenuation added in step 1070, and the predetermined amount of attenuation reduced in step 1100 are all variables that are currently based, at least partially, on hardware design limitations and can, depending on the hardware, be adjusted by one skilled in the art based on the conditions experienced in a particular CATV system and with particular CATV equipment. As discussed above, the variable signal level adjustment device in one embodiment of the present invention is a step attenuator having a resolution of 1 dB and a range of 32 dB. Accordingly, the amount of additional attenuation added in step 1070 using the present hardware could be 1 dB or multiples of 1 dB. Similarly, the predetermined amount of attenuation reduced in step 1100 can be 1 dB or multiples of 1 dB, <1 dB or >1 dB. It should be understood that if the amount of additional attenuation added in step 1070 is a multiple of 1 dB, such as 5 dB, the amount of attenuation reduced in step 1100 can be a lesser amount, such as 2 dB or 4 dB. The amount of attenuation reduced in step 1100 can also be greater than the amount of additional attenuation added in step 1070 for the reasons stated above relating to maintaining the quality of the output from the modem 140 and the and durability of the modem 140.

The predetermined threshold compared in step 1060 is a signal level sufficient to distinguish the presence of upstream data packets in the upstream bandwidth from interference signals. This value will vary depending on the output power of any cable modem 140, STB, STU, etc. in the system and the average observed level of interference signals. A goal is, for example, to determine if a device is present that sends upstream data packets via the upstream bandwidth. If the predetermined threshold is set too low, the interference signals may appear to be upstream data packets, but if the predetermined threshold is set too high, the upstream data packets may appear as interference signals.

Any of the high quality, commercially available signal couplers, signals level detectors, variable attenuation devices, filters, amplifiers, and microprocessors will function well within the specified locations within the premise device 100.

Referring now to FIG. 8 the premise device 100 may include circuit components creating the downstream bandwidth output level and/or output level tilt compensation device 3, which helps to maintain a desired signal quality in transmitted signals using relatively high frequencies within the downstream bandwidth, which are much more susceptible to traditional parasitic losses. At a simplistic level, the microprocessor 810 observes channel data obtained from the tuner circuit 600, compares the observed channel data to a known parasitic loss curve, and then adjusts a pair of variable output level compensation devices 440, 450 and a variable slope adjusting circuit 460 located in the circuit 200 to create an output having a desired gain curve (i.e., a curve representative of transmitted signal strengths) across the downstream bandwidth. While each of the variable output level compensation devices 440, 450 are depicted in FIG. 8 as a variable attenuator, it should be understood that the term "variable output level compensation device" used herein should be understood to include not only a variable attenuation device, but also circuits containing a variable amplifier, AGC circuits, other variable amplifier/attenuation circuits, and related optical circuits that can be used to alter the signal strength of signals in the downstream bandwidth. Each of these steps will be discussed in further detail below.

The tuner circuit 600 obtains the downstream bandwidth from a coupler 420 drawing the downstream bandwidth off of the forward path 930 (FIG. 4). Please note that these signals will be referred to herein as the coupled downstream bandwidth. The coupled downstream bandwidth is passed through a resistor 430 prior to being passed into a tuner 610.

Through instructions provided by the microprocessor 810, the tuner 610 scans the coupled downstream bandwidth in an effort to locate and identify a channel having a low frequency, referred to herein as a low band signal channel, and a channel having a high frequency, referred to herein as a high band signal channel. In the present instance, the microprocessor 810 instructs the tuner 610 to begin at the lowest frequency in the downstream bandwidth and scan toward higher frequencies until the low band signal channel is found. Similarly, the microprocessor 810 instructs the tuner 610 to begin at the highest frequency in the coupled downstream bandwidth and scan toward lower frequencies until the high band signal channel is found. Accordingly, the low band signal channel is a channel located near the lowest frequency within the coupled downstream bandwidth while the high band channel is a channel located near the highest frequency within the coupled downstream bandwidth. Even though the low band signal channel and the high band signal channel are depicted as a single frequency for clarity, it should be understood that a channel is typically a range of frequencies. It should also be understood that the low band signal channel and the high band signal channel do not need to be the lowest or highest frequency channels, respectively. It is beneficial, however that the two channels be spaced as far apart from one another as practical to better estimate the amount of parasitic loss experiences across the entire downstream bandwidth.

During the scanning process to locate and identify the low and high band signal channels, the tuner circuit 600 provides the microprocessor 810 with three types of information. First, a signal indicating that a channel has been identified is provided to the microprocessor 810 through input line 640. Second, a signal indicating signal strength of the identified channel is provided to the microprocessor 810 through input line 630. Third, a signal indicating the format of the identified channel is provided to the microprocessor 810 through input line 620.

The signal indicating that a channel has been identified is created by passing the coupled downstream bandwidth through a band pass filter 650 to remove extraneous noise, a signal level detector 660 to convert signal into a voltage, and another signal level detector 670. The signal leaving the signal level detector 670 is compared to a predetermined threshold voltage using comparator 680. The predetermined threshold voltage is created using a voltage source 690 and an resistive divider 700, and is set such that if the voltage associated with the coupled downstream bandwidth at the tuner frequency is greater than the threshold voltage, it is likely a channel in use by the supplier 20, whereas if the voltage associated with the coupled downstream bandwidth at the tuner frequency is less than the threshold voltage, it is likely interference signals.

The signal indicating signal strength is created similarly to the signal indicating that a channel has been identified. The signal indicating signal strength passes through comparator 720 when it is greater than a threshold voltage created by a voltage source 730 and a resistive divider 740. To clarify the differences, the signal indicating that a channel has been identified may not have any direct relation to the actual signal strength, whereas the signal indicating signal strength is directly proportional to the actual signal strength of the identified channel.

The signal indicating the format of the identified channel is created when the coupled downstream bandwidth passes through a channel analyzer, which includes the band pass filter 650, the signal level detector 660, a synch detector 750, a low pass filter 760, and a signal level detector 770. The resulting signal identifies whether the identified channel is an analog format channel or anther type of signal format.

According to current signal transmission specifications, digital format channels have a signal strength that is typically 6 dB less than a corresponding analog channel. Accordingly, the microprocessor 810 must include a level offset calculation that can account for this 6 dB difference when comparing the relative signal strengths of the low and high band signal channels. If this inherent difference is not accounted for, any resulting comparisons of the two channels for the purpose of determining relative signal strengths would necessarily be flawed. For example, if the high band channel is digital while the low band channel is analog, the additional, inherent 6 dB difference would incorrectly indicate that there are more parasitic losses than actually exist. Similarly, if the high band channel is analog and the low band channel is digital, any resulting comparison would incorrectly indicate that there is less parasitic loss than actual. Therefore, it should be understood that it does not matter whether the 6 dB offset is added to the signal strength of a digital format channel or the 6 dB offset is subtracted from the signal strength of an analog format channel Further, it should be understood that the 6 dB offset can be added to the signal strength of both the low and high band channels if they are both digital or the 6 dB offset can be subtracted from the signal strength of both the low and high band channels if they are both analog. Even further, it should be understood that the offset value is dictated by the standards observed by a particular supplier and can be, therefore, a value other than 6 dB.

After completing the scanning process and the process to add or subtract any offsets, the microprocessor 810 now has a low band signal strength (including any offset), a low band channel frequency, a high band signal strength (including any offset), and a high band channel frequency. The known information (i.e., the strength and frequency) of the low and high band channels are now compared, by the microprocessor 810, to a predetermined signal strength loss curve (i.e., a gain loss curve), which corresponds to the known parasitic losses associated with the type of coaxial/optical cables used. This step beneficially allows the known information to be interpolated across the entire downstream bandwidth. Using the interpolated curve, the microprocessor 810 determines how much signal level adjustment to apply and in what manner to apply the level adjustment across the entire downstream bandwidth such that the a resulting gain curve across the entire bandwidth is nearly linear and preferably with a slight increase in gain toward the higher frequencies in anticipation of parasitic losses that will occur downstream from the premise device 100. For example, the amount of level is determined by the high band signal strength (i.e., high band gain) including any interpolation to the highest frequency, and the amount of level reduction is determined by the low band signal strength (i.e., low band level) including any interpolation to the lowest frequency.

It should be understood that parasitic losses affect higher frequencies more than lower frequencies. Accordingly, if a known signal having a −10 dB signal strength, for example, is transmitted at various frequencies across the entire downstream bandwidth and across a length of coaxial/optical cable, a plot of the resulting gain curve would result in a curve, which is known. Because the end goal is to have a gain curve that is a straight line near the original signal strengths or to have a gain curve that has an increasing slope versus frequency, the microprocessor 810 directly controls the variable slope adjustment circuit to adjust the downstream signal transmission in curve such that the lower frequencies are lower in amplitude than the higher frequencies.

For example, using the known frequency and signal strength for each of the low band channel and the high band channel, a gain curve can be plotted across the entire downstream bandwidth, for example, from 50 MHz to 1000 MHz. The microprocessor 810 then determines a total amount of level adjustment to be added by the amplifier 490 and/or the amplifier 500 that will at least replace the loss at the highest frequency. In the present example, the amount of level adjustment would be at least +38 dB, resulting in a gain curve. Based on the interpolated gain curve, the microprocessor 810 instructs the variable slope circuit 460 to apply a similar, but inversely curved amount of correction to result in a relatively flat gain curve. It may be desirable to increase the amount of level adjustment applied and increase the curvature of the slope adjustment to result in a gain curve, which has an increasing slope toward the higher frequencies.

As with the other devices discussed above, the downstream bandwidth output level and/or output level tilt compensation device 3 can be activated automatically upon initialization of the premise device 100, at set intervals, upon the occurrence of a particular event, and/or upon receipt of an information signal (e.g., a tone, a coded operating signal, etc.) from the supplier 20.

The premise device may 100 include, for example, a configurable frequency band selection device 1 (as described in detail in U.S. application Ser. No. 12/252,907) (FIG. 4), an upstream bandwidth conditioning device 2 (as described in detail in U.S. application Ser. No. 12/252,817) (FIGS. 5 and 6), and/or a downstream output level and/or output level tilt compensation device 3 (as described in detail in U.S. application Ser. No. 12/252,850) (FIG. 3). These applications should be referenced when further information about these devices is desired. The function of each of these devices, and others, will be discussed herein to such a degree that is relevant to the present application, and to such a degree that enables the use of the present application with these, and other, devices.

As discussed above, in each of the configurable frequency band selection device 1 (FIG. 4), the upstream bandwidth conditioning device 2 (FIGS. 5 and 6) and/or the downstream output level and/or output level tilt compensation device 3 (FIG. 8) a modem 302 may be provided to increasing the functionality of the overall premise device.

As mentioned above, the modem 302 may be used for a variety of uses. First the modem 302 may be used for the control and monitoring of the premise device 100. For example, Table 1 includes a selection of variables, measurements, and other control items that can be collected and saved by the microprocessor 810 and/or a memory device attached to the microprocessor 810, or remotely recorded for analysis. This collected information may be transmitted to a remote site or control site for analysis, accessed remotely by a remote site or control site, accessed by a technician via the Internet and/or may be accessed directly via a wired connections such as wired outputs 322 or via a wireless connection using the antenna 308. By saving information such as the exemplary operational information included in Table 1, the premise device can operate as a powerful testing and monitoring device that is located in or proximate to the premise of the user.

The modem 302 may be used to (1) automatically transfer the operational information to a remote site (e.g., via the Internet), (2) transfer the operational information to the remote site only when requested to so, and/or (3) transfer information to the remote site when a problem or other error is detected. The modem 302 may be used to (1) automatically transfer the operational information to a technician via the Internet, (2) transfer the operational information to the technician only when requested to so, and/or (3) transfer information to the technician when a problem or other error is detected. To accomplish these tasks, the modem may be separately addressable such that the remote site or the technician may access the particular premise device 100 using traditional Internet methods. The modem may also be accessed by the remote site or the technician using proprietary or known wireless information transfer methods through the antenna 308.

As mentioned above, the modem may also be attached to a switch/splitter/router ("router") 318 to allow for the connection of a variety of devices via the antenna 308 and/or the wired outputs 322. Similar to above, the wireless connection may be any of the known communication protocols, such as 802.11, or propriety protocol, such as may be the case when transferring information related specifically to the premise device 100, as opposed to traditional Internet or VoIP information.

Further, the modem 302 may be used to allow outside control of the premise device. Such control could be accomplished via the Internet over the CATV system, via a wireless communication protocol, and/or via a hardwired connection to one of the wired outputs 322. Such control could be accomplished via the remote control site or a remote technician over the CATV system, via a wireless communication protocol, and/or via a hardwired connection to one of the wired outputs 322.

The information available relating to the premise device 100 may be grouped into standardized groups of information making access and utilization of the information more easily accomplished. Possible groupings are shown in the attached Table 1.

In accordance with one embodiment of the application, a premise device can include a data controller circuit and a conditioning circuit. The data controller circuit is provided to collect; collect and store; collect, store and analyze; collect and transfer; or collect, store, analyze and remotely transfer; or combinations thereof exemplary operational data such as included in Table 1 for a corresponding premise. In one embodiment, the data controller circuit can include a modem.

At the remote site, the collected information from at least one premise device, a representative sample of premise devices, or up to all premise devices can be procedurally stored for analysis (e.g., according to prescribed rules in a database). The collected information can then be analyzed. The analyzed data can be reviewed for patterns among a plurality of premise devices by locations, corresponding premise set-ups, corresponding premise installed equipment or reported/recorded errors or problems. The collected information can be reviewed for comparative purposes with other premise devices to enable trends among the premise device collected data to be identified. Such trends can also be determined with respect to time, environmental conditions or data distribution similarities. For example, one or more selected readings from various premise device control settings or premise device data measurements can be monitored over time. Such selected readings can include exemplary operational data from Table 1. In one embodiment, such pattern recognition in the analyzed data can result in identification of sources that can result in noise inside (upstream or downstream) the communication system or a portion thereof. In one embodiment, such pattern recognition or the analyzed data can result in the provision of functionality level reports for portions or all of the communication system. In one embodiment, such pattern recognition or the analyzed data can result in the increase of functionality (e.g., decrease of down time) for portions or all of the communication system. Further, patterns and/or trends resulting from analyzed or collected information can be presented graphically for ease of understanding. Responsive to identified trends or analyzed collected data, control information can be transmitted back from the remote site for the purpose of adjusting operations of at least one premise device to improve or optimize its operations or for the purpose of adjusting operations of a plurality of premise devices (e.g., premise devices connected on a street or neighborhood, premise devices connected to an identified equipment or hardware) including the at least one adjusted premise device to improve or optimize overall operations of the thereby adjusted plurality of premise devices Alternatively, responsive to identified trends or analyzed collected data, control information can be transmitted back from the remote site for the purpose of adjusting operations of thereby adjusted premise devices to improve or optimize their operations or to improve or optimize overall operations of an additional plurality of premise devices including the adjusted premise devices. Exemplary collected information to transmit remotely, analyze, evaluate for patterns and receive adjustments for operational levels of the like are shown in Table 1. In one embodiment, the collected data can constitute services provided by more than one service provider and overall analysis can then be tailored to selected ones of the service providers (e.g., CATV service providers). In one embodiment, the remote site can be a master premise device.

In one embodiment, exemplary data such as described in Table 1 can be provided downstream (e.g., by the modem) on the forward path to a data collection device. For example, the data collection device can include a memory circuit, a controller including a data collection circuit, a data collector or a second modem that can be located at the user premise or in the premise device 100. The data collection device can operate to subsequently transmit received data collectively, periodically, repeatedly, responsive to an inquiry or operator action. The data collection device can operate to subsequently transmit received data individually or in various combinations.

It is envisaged that the information collected may be used to determine selected settings or an optimum setting that could/should be used by other premise devices 100 in use within the CATV system. In turn the individual premise devices 100 may be instructed, through the modem or any of the other signal received discussed above, to operate in a particular manner.

The premise device may also be used to collect, store and transfer information received from active connectors (not shown) located throughout the premise. The term "connector" is used herein to describe connectors used to attach a signal cable to a device or other signal cable. For example, a typical premise uses an "F" type connector to attach signal cables between a splitter and an end use device, such a television. The term "connector" is also used herein to describe splitters.

These connectors may have sensors that measure moisture, signal levels, clamp load, torque, termination status, upstream bandwidth signal levels, and downstream bandwidth signal levels. Each of these measurements or combinations thereof may be remotely recorded for analysis or collected and stored within the premise device for transmission to a remote site for collection, storage or analysis. Each of these measurements may be collected and stored within the premise device 100 for collection or transfer to a technician.

To further aid any troubleshooting and/or monitoring, each of these connectors may be registered with the particular premise device by the technician installing the connector. For example, the connector may include an RFID tag that identifies its type and other identifying characteristics to a handheld device. The technician may then enter additional information relating to the connectors location within the premise. Then, all of the collected information may be registered with the particular premise device 100 wirelessly via the antenna 308 or through the wired outputs 322.

It is envisaged that the premise device 100 may also include the ability to terminate any of the connectors based on information provided by the connectors or by the premise device 100. The term "terminate" means, in this instance, either (1) the placement of a resistive load between a conductor in the connector and a ground of the connector (2) or an opening of a circuit along the conductor. In either case, the termination reduces or precludes the ingress of undesirable interference signals through the connector.

The premise device 100 may provide the power required for each of the connectors. The premise device 100 may provide a DC current through the premise-side connector to power the connectors. The connectors may include an energy storage device, such as a capacitor or battery so that the DC only needs to be sent by the premise device for a few minutes each day or at some other periodic interval. Alternately, the premise device 100 may provide energy in the form of RF energy at an unused frequency or at a frequency that would not affect the other signals. Similarly, the RF energy may only need to be sent by the premise device 100 at periodic intervals.

TABLE 1

Exemplary Measured Values to be saved and reported a. Basic Environmental Requirements
   i. DC Power Supply
      1. AC Wall Power
         a. 12.0 +/− .5 V
            i. Actual Value
            ii. Yes (AC power in range)/No (AC power is not available)
      2. DC Battery Backup
         a. 9.0 +/− .5 V
            i. Actual Value
            ii. Yes (DC battery backup in range)/No (No battery backup)
   ii. Bypass Mode
      1. No information reported, the premise device is bypassed
   iii. Battery
      1. Health
         a. Number of uses
            i. Greater than a predetermined number of uses
               1. 2000 uses
            ii. Actual Value
            iii. Yes (Over predetermined number of uses)/No (Less than predetermined number of uses)
         b. Hours of use
            i. Greater than a predetermined number of hours
               1. 2000 hours
            ii. Actual Value
            iii. Yes (Over limit of predetermined number of hours, e.g., 2,000 hours)/No (Under limit of predetermined number of hours)
         c. Hours of charge
            i. Greater than a predetermined number of hours
               1. 2000 hours
            ii. Actual Value
            iii. Yes (Charge over predetermined number of hours)/No (Less than predetermined number of hours)
         d. Estimated battery power available
            i. Less than a predetermined threshold of hours
               1. 1 hour
            ii. Actual Value
            iii. Yes (At current rate of use, battery power over predetermined threshold)/No (At current rate of use, battery power less than predetermined threshold)

TABLE 1-continued

Exemplary Measured Values to be saved and reported b. Total Bandwidth Allocation
   i. Information transmission signal
      1. Tone
         a. Frequency
            i. Tone Sent in Frequency Within Upstream Bandwidth
               1. Yes/No
            ii. Tone Sent in Frequency Within Downstream Bandwidth
               1. Yes/No
            iii. Actual Frequency
         b. Present
            i. Yes (There is tone in use)/No (No tone in use)
      2. Coded Operational Signal
         a. Frequency
            i. Coded Operational Signal Sent in Frequency Within Upstream Bandwidth
               1. Yes (Signal sent in frequency within upstream bandwidth)/No (No signal sent)
            ii. Coded Operational Signal Sent in Frequency Within Downstream Bandwidth
               1. Yes (Signal sent in frequency within downstream bandwidth)/No (No signal sent)
            iii. Actual Frequency
         b. Present
            i. Yes (Coded operational signal in use)/No (No coded operational signal in use)
         c. Instructions
            i. Actual (e.g., actual received or sent instructions stored)
   ii. Diplexer set change
      1. Active Diplexer Set
         a. Set A
         b. Set B
      2. Variable Diplexer Set
         a. Cut-off Frequency Set Point
            i. Actual
            ii. Presets
               1. Preset A
               2. Preset B
c. Downstream Bandwidth/Forward Path
   i. Downstream Bandwidth Gain and Level
      1. Hi channel selection
         a. Selected channel (possibly index location)
            i. Actual channel information
               1. Frequencies
               2. Standardized channel identifier
         b. Are there transmitted signals being received at the selected channel
            i. Yes (At the selected channel)/No (No signals received at selected channel)
         c. What is the type of the transmitted signals being received at the selected channel
            i. Analog/Digital
         d. What is the level of the transmitted signals being received at the selected channel
            i. Scaled measurement
               1. 0-255
            ii. Actual measurement
               1. In dBmV
         e. What is the desired level of the high channel
            i. Scaled measurement
               1. 0-255
            ii. Actual measurement
               1. In dBmV
      2. Low channel selection
         a. Selected channel (possibly index location)
            i. Actual channel information
               1. Frequencies
               2. Standardized channel identifier
         b. Are there transmitted signals being received at the selected channel
            i. Yes (At the selected channel)/No (No signals received at selected channel)
         c. What is the type of the transmitted signals being received at the selected channel
            i. Analog/Digital TABLE 1-continued Exemplary Measured Values to be saved and reported

- d. What is the level of the transmitted signals being received at the selected channel
  - i. Scaled measurement
    1. 0-255
  - ii. Actual measurement
    1. In dBmV
- e. What is the desired level of the high channel
  - i. Scaled measurement
    1. 0-255
  - ii. Actual measurement
    1. In dBmV
- 3. What is the gain attenuator setting
  - i. Scaled measurement
    1. 0-255
  - ii. Actual measurement
    1. In dB
- 4. How is the slope circuit being driven
  - i. Scaled measurement
    1. 0-255 (Full range)
    2. 60-240 (Limited range due hardware)
  - ii. What is the desired slope value
    1. Scaled measurement
      a. 0-255
    2. Actual measurement
      a. In dB
- 5. What is the predetermined offset value to be used between Analog and Digital channels
  - i. Scaled measurement
    1. 0-255
  - ii. Actual measurement
    1. In dB
- d. Return path
  - i. Type of return path manipulation
    1. Termination
      a. Yes (Upstream transmitter device detected on return path or no device but return path terminated)/No (No device on return path and no termination)
    2. Total return path attenuation
      a. Yes (Entire return path attenuated)/No (Portion of return path not attenuated)
        i. What is the detected signal level
          1. Scaled measurement
            a. 0-255 (Full range)
            b. 0-210 (Limited range)
          2. Actual measurement
            a. In dBmV
        ii. What is the gain attenuator setting
          1. Scaled measurement
            a. 0-255
          2. Actual measurement
            a. In dB
    3. Frequency selective attenuation
      a. Specific frequencies
        i. Actual frequencies
      b. Incremental frequencies
        i. Relevant increment size (e.g., 1 MHz, 5 MHz, 10 MHz, etc.)
        ii. Increments Selected
      c. Amount of attenuation of the selected frequencies
        i. Scaled measurement
          1. 0-255
        ii. Actual measurement
          1. In dB
- e. Pilot and Data Receiver
  - i. From the downstream bandwidth
    1. Frequency
      a. What frequencies are active/are being used to receive information transmission signal
    2. Information transmission signal
      a. Pilot Tone
      b. Data
    3. What information is being received
      a. Set unit permanently to Hi-split diplexer
      b. Set specific Hi measurement channel
      c. Set specific Low measurement channel
      d. Set new output slope value
      e. Set new Hi Frequency output value
      f. Reset to Pilot tone diplexer switching
      g. Set unit permanently to Low-split diplexer
      h. Set new upstream bandwidth noise threshold limit value
      i. Digital to analog channel level difference
      j. Reset to factory defaults
      k. On next power reset, chose last settings or factory default
      l. Return level adjustment
      m. Set new return noise threshold limit value
      n. Terminate the return path
      o. Attenuate/pass specific frequencies in the return path
      p. Customer number and address
      q. Synchronize time/date
  - ii. From the upstream bandwidth/return path
    1. Frequency
      a. What frequencies are active/are being used to receive information transmission signal
    2. Information transmission signal
      a. Pilot Tone
      b. Data
    3. What information is being received
      a. Set new upstream bandwidth noise threshold limit value
      b. Reset to factory defaults
      c. Return level adjustment
      d. Set new return noise threshold limit value
      e. Terminate the return path
      f. Attenuate/pass specific frequencies in the return path
      g. Customer number and address
      h. Connector Information
        i. Connector Type
          1. Type
            a. Cable end
            b. Union
            c. Splitter
          2. Manufacturer
          3. Serial Number
          4. Installation Date
          5. Installation technician identification
        ii. Connector Location
          1. Living Room
          2. Kitchen
          3. Bedroom 1
          4. Bedroom 2
          5. Bedroom 3
          6. Bedroom 4
          7. Dining room
          8. Bathroom
          9. Office
        iii. Connector Function
          1. Moisture
            a. Present/Not present
          2. Clampload resulting from torque
            a. Acceptable/Not acceptable
            b. Actual value
            c. Scaled measurement
              i. 0-255
            d. Actual measurement
              i. In Newton/pound
          3. Termination
            a. Yes (Device connected or connector provides termination)/ No (Not terminated)
          4. Downstream bandwidth/forward path
            a. Scaled measurement
              i. 0-255
            b. Actual measurement
              i. In mV
            c. Threshold value
              i. Above/below
          5. Return Path signal level
            a. Scaled measurement
              i. 0-255
            b. Actual measurement
              i. In mV
            c. Threshold value
              i. Above/below TABLE 1-continued Exemplary Measured Values to be saved and reported f. Data Transmission
   i. IP address (TCP/IP)
   ii. MAC Identification
   iii. Any of the information/variables/measurements identified above
      1. Real time or "moment in time" values.
      2. Supervisory/trend data
         a. Rate of data change
            i. Slow changes of most variables means something vs. rapid changes
               1. slow change of downstream attenuation normal, rapid means that there has been a failure at some point in the distribution system
            ii. Frequency and amplitude of change, particularly outside of predetermined range cycling of variable is to be expected, but large changes, or changes occurring often can indicate trouble
               1. seasonal or daily swing in downstream bandwidth tilt may be attributable to normal temperature variation
               2. random spikes or trends in direction opposite to expected can indicate cable damage
            iii. Combinations of variables changing simultaneously individually change of a particular variable at a rate within normal limit, and/or of an amplitude not outside an acceptable range would not be cause for concern, but when assessed in view of other complimentary variables changing at the same time may indicate a problem
               1. temperature fluctuations combined with tilt information
                  a. movement of either considered independently may not raise a flag, but if they are both moving and moving in directions opposite from what would be expected, it can indicate a problem.
   iv. Echo input information back to head end to verify proper data receipt by the unit
   v. Time and date the unit reverted back to a more broad (Mode 1) downstream bandwidth/forward path adjustment routine due to significant signal level changes
   vi. Time and date the unit reverted back to an initial (Mode 0) adjustment routine due to significant signal level changes
   vii. General information
      1. Equipment identification
         a. Type
         b. Model
         c. Brand
         d. In service date
      2. Location information
         a. Physical address
         b. Customer ID
   viii. Environmental information
      1. Relative humidity inside housing
      2. Relative humidity inside housing versus temperature
      3. Barometric pressure inside housing
      4. Barometric pressure inside housing versus temperature While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. An apparatus comprising:
a housing to connect at a signal transmission line of a CATV system at a premise of a user downstream of a first signal transmission line configured to be used by a plurality of users;
a modem to receive downstream information and to receive upstream information;
a conditioning control circuit to modify a signal on said signal transmission line transmitted between the premise and the first signal transmission line wherein the conditioning control circuit is a downstream bandwidth output level and/or output level tilt compensation device comprising: a tuner configured to scan a downstream bandwidth to identify at least one low band channel and at least one high band channel; a channel analyzer configured to determine a format of each of the low band channel and the high band channel; a signal measurement device configured to measure a low band signal strength of the low band channel and a high band signal strength of the high band channel; an offset circuit configured to perform at least two of (i) add a first offset value to the low band signal strength when the low band channel is a digital format, (ii) subtract a second offset value from the low band signal strength when the low band channel is an analog format, (iii) add a the first offset value to the high band signal strength when the high band channel is the digital format, and (iv) subtract the second offset value from the high band signal strength when the high band channel is the analog format; a microprocessor configured to compare the low band signal strength and the high band signal strength, including any offset values, to a predetermined signal strength loss curve; a variable output level compensation device; and a variable slope adjusting circuit.

2. The apparatus of claim 1, wherein the modem comprises:
one or more NIC connected to the modem;
a switch/splitter device connected to the modem; and
a plurality of user devices connected to the modem, said one or more NIC, or the switch/splitter device, wherein the conditioning control circuit comprises a drop line conditioning circuit, wherein the drop line conditioning circuit comprises a controller coupled to a NIC.

3. The apparatus of claim 1, the modem to provide data upstream, the data to include a scaled measurement or an actual measurement of a downstream gain setting implemented by the conditioning control circuit and a downstream slope adjustment setting implemented by the conditioning control circuit.

4. The apparatus of claim 1, the modem to provide data upstream, the data to include an upstream attenuation setting, an active frequency selection, and an incremental frequency size; wherein the upstream attenuation setting is implemented by the conditioning control circuit.

5. The apparatus of claim 1, the modem to provide premise connector information upstream, the premise connector information to include one of connector type, connector location, connector serial number, connector installation date, or a connector installer identifier for a plurality of connectors installed at the premise.

6. The apparatus of claim 1, the modem to provide connector termination status for a plurality of connectors installed at the premise.

7. The apparatus of claim 1, comprising a battery backup device coupled to supply backup power to the modem and the conditioning control circuit.

8. The apparatus of claim 1, further comprising:
a plurality of apparatus each located at a different premise; and
a controller to receive and analyze downstream or upstream bandwidth characteristics to identify selected differences over a corresponding threshold among said characteristics provided by at least one different apparatus.

9. The apparatus of claim 1, the modem to provide data upstream, the data to include a rate of change of downstream gain setting or tilt adjustment, wherein the rate of change of downstream gain setting or tilt adjustment is not detected within a prescribed time after the conditioning control circuit is enabled, wherein the rate of change of downstream gain setting or tilt adjustment over a prescribed threshold is indicative of an error condition.

10. The apparatus of claim 1, the modem to supply a rate of change of a first downstream bandwidth characteristic and a rate of change of a second downstream bandwidth characteristic, where an inverse correlation of the rates of change is responsive to an error condition at the premise.

11. The apparatus of claim 1, wherein the conditioning control circuit comprises an upstream bandwidth conditioning device comprising:
a variable signal level adjustment device configured to create an amount of signal level adjustment to an upstream bandwidth;
a signal measurement circuit configured to measure a first signal strength of the upstream bandwidth prior to applying an incremental amount of additional signal level adjustment and a second signal strength after applying the incremental amount of additional signal level adjustment; and
a circuit configured (i) to compare the first signal strength to the second signal strength and (ii) to remove at least a portion of the incremental amount of additional signal level adjustment when the first signal strength is greater than the second signal strength.

12. The apparatus of claim 11, further comprising:
a first frequency band splitting device being located between the variable signal level adjustment device and a premise side; and
a second frequency band splitting device being located between the variable signal level adjustment device and a supplier side;
wherein the signal measurement circuit comprises a signal level detector configured to output a signal representative of a level of the upstream bandwidth after application of the amount of signal level adjustment and any of the incremental amount of additional signal level adjustment,
wherein the circuit is configured to iteratively determine whether the incremental amount of additional signal level adjustment is to be applied; and
wherein the circuit is configured to remove the portion of the incremental amount of additional signal level adjustment when the first signal strength is greater than the second signal strength.

13. The apparatus of claim 1, where the apparatus is positioned proximate the premise, inside the premise, or outside the premise, wherein the downstream information and the upstream information is one of a telephone call, a web page, a television program, a game application data, a video, or emergency signals or control signals for the apparatus, for other user equipments or a supplier.

14. The apparatus of claim 1, wherein the conditioning control circuit is a frequency band selection device comprising:
at least two signal path sets between a tap side and a premise side, each signal path set comprising two discrete signal paths, a high frequency signal path allowing a downstream bandwidth to pass from the tap side to the premise side and a low frequency signal path allowing an upstream bandwidth to pass from the premise side to the tap side, the high frequency signal path and the low frequency signal path being separated by a cut-off transition frequency that is different for said each signal path set;
a switch controller having at least two discrete switch positions, the switch controller choosing one of the at least two discrete switch positions as a result of an information signal, each of the at least two discrete switch positions corresponding to a respective one of the signal path sets;
a tap side filter set including at least two frequency band splitting devices selectable by a tap side switch set wherein the tap side switch set comprises a tap side downstream switch and a tap side upstream switch; and
a premise side filter set including at least two frequency band splitting devices selectable by a premise side switch set wherein the premise side switch set comprises a premise side downstream switch and a premise side upstream switch,
wherein the tap side switch set and the premise side switch set are actuated by the switch controller.

15. The apparatus of claim 1, wherein an amount of signal level adjustment provided by the variable output level compensation device is determined based on the high band signal strength; and
wherein an amount of slope adjustment provided by the variable slope adjusting circuit is determined based on the low band signal strength, wherein the signal measurement device is arranged to measure the high band signal strength and the low band signal strength downstream from the variable output level compensation device.

16. The apparatus of claim 1, the modem to provide selected data downstream on a forward path to a data collection device, the data collection device comprises a memory circuit, a controller including a data collection circuit, a data collector or a second modem, the data collection device to subsequently transmit said selected data collectively, periodically, repeatedly, responsive to an inquiry or operator action, individually or in combinations.

17. The apparatus of claim 1, the modem to provide digital channel type or analog channel type information upstream for a selected channel, block of channels, plurality of channels, or responsive to a request or a channel type change.

* * * * *